US011621909B2

(12) United States Patent
Bamford et al.

(10) Patent No.: US 11,621,909 B2
(45) Date of Patent: Apr. 4, 2023

(54) SYSTEMS AND METHODS FOR PROVIDING A DYNAMIC-HYBRID FORWARDING INFORMATION BASE (DHFIB)

(71) Applicant: Level 3 Communications, LLC, Broomfield, CO (US)

(72) Inventors: Stewart Bamford, London (GB); Brent Wharton Smith, Arvada, CO (US); Noah Kipling Weis, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 17/712,682

(22) Filed: Apr. 4, 2022

(65) Prior Publication Data

US 2022/0231935 A1 Jul. 21, 2022

Related U.S. Application Data

(63) Continuation of application No. 17/339,783, filed on Jun. 4, 2021, now Pat. No. 11,303,556.

(60) Provisional application No. 63/035,409, filed on Jun. 5, 2020.

(51) Int. Cl.
*G06F 15/173* (2006.01)
*H04L 45/02* (2022.01)
*H04L 45/741* (2022.01)
*H04L 45/302* (2022.01)
*H04L 45/00* (2022.01)

(52) U.S. Cl.
CPC .......... *H04L 45/02* (2013.01); *H04L 45/3065* (2013.01); *H04L 45/38* (2013.01); *H04L 45/741* (2013.01)

(58) Field of Classification Search
CPC ..... H04L 45/02; H04L 45/3065; H04L 45/38; H04L 45/741
USPC .......................................................... 709/238
See application file for complete search history.

(56) References Cited

U.S. PATENT DOCUMENTS

| 7,830,871 B2* | 11/2010 | Takayama | H04L 61/5092 370/392 |
| 8,239,572 B1* | 8/2012 | Brandwine | H04L 45/04 709/224 |
| 8,391,289 B1* | 3/2013 | Yalagandula | H04L 12/2825 370/392 |
| 10,666,580 B1* | 5/2020 | Callaghan | H04L 45/42 |
| 2007/0047463 A1* | 3/2007 | Jarvis | H04L 45/74591 370/254 |

(Continued)

*Primary Examiner* — Anthony Mejia

(57) ABSTRACT

A routing system can provide a Dynamic-Hybrid Forwarding Information Base (DHFIB). A control component of the routing system can build a routing table that includes routing information (e.g., prefixes, addresses, etc.) for use by a first routing component. The routing table can be ordered or ranked based on traffic information from the first routing component. Then, the control component can create the DHFIB from the routing table, wherein the DHFIB is a portion of the routing table and related to the first routing component. As such, the portion of the routing table selected for the DHFIB can be the set of prefixes in the routing table that represent the most frequently routed or most important prefixes in the routing table. Finally, the control component can forward the DHFIB to the first routing component to allow the routing component to route communications.

9 Claims, 9 Drawing Sheets

(56) References Cited

U.S. PATENT DOCUMENTS

| | | | |
|---|---|---|---|
| 2007/0121524 A1* | 5/2007 | Rangarajan | H04L 45/02 370/252 |
| 2007/0140107 A1* | 6/2007 | Eckert | H04L 45/30 370/216 |
| 2008/0285463 A1* | 11/2008 | Oran | H04L 65/80 370/241 |
| 2009/0073996 A1* | 3/2009 | Swallow | H04L 45/02 370/401 |
| 2010/0215047 A1* | 8/2010 | Filsfils | H04L 49/3009 370/395.31 |
| 2011/0249682 A1* | 10/2011 | Kean | H04L 45/38 370/401 |
| 2012/0020364 A1* | 1/2012 | Zinjuwadia | H04L 45/745 370/401 |
| 2014/0075048 A1* | 3/2014 | Yuksel | H04L 67/563 709/242 |
| 2014/0119379 A1* | 5/2014 | Liang | H04L 45/54 370/400 |
| 2014/0369356 A1* | 12/2014 | Bryant | H04L 45/745 370/392 |
| 2015/0078381 A1* | 3/2015 | Willis | H04L 45/28 370/392 |
| 2016/0330102 A1* | 11/2016 | Fenner | H04L 45/02 |
| 2017/0195181 A1* | 7/2017 | Birmiwal | H04L 45/02 |
| 2017/0207963 A1* | 7/2017 | Mehta | H04L 49/3063 |
| 2017/0359254 A1* | 12/2017 | Oran | H04L 69/22 |
| 2018/0006935 A1* | 1/2018 | Mutnuru | H04L 67/1001 |
| 2018/0181604 A1* | 6/2018 | Marohn | G06F 16/2264 |
| 2018/0278517 A1* | 9/2018 | Narayanan | H04L 45/48 |
| 2018/0367392 A1* | 12/2018 | Harneja | H04L 41/06 |
| 2020/0136981 A1* | 4/2020 | Byun | H04L 47/2475 |
| 2020/0145316 A1* | 5/2020 | Sosthène Enguehard | H04L 47/822 |
| 2020/0396163 A1* | 12/2020 | Koral | H04L 47/11 |
| 2021/0049078 A1* | 2/2021 | Khan | G06F 3/0652 |
| 2021/0385151 A1 | 12/2021 | Bamford | |

* cited by examiner

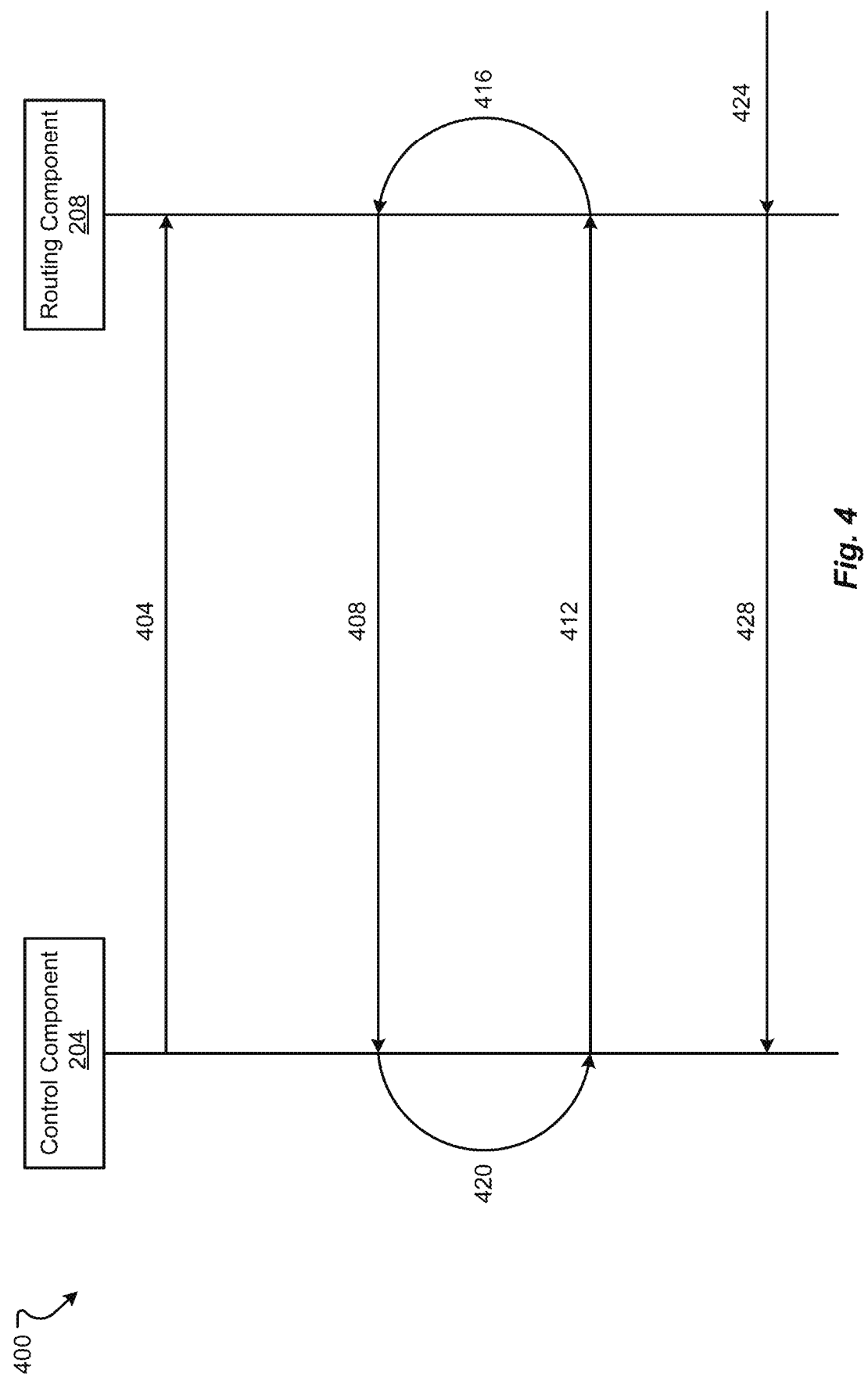

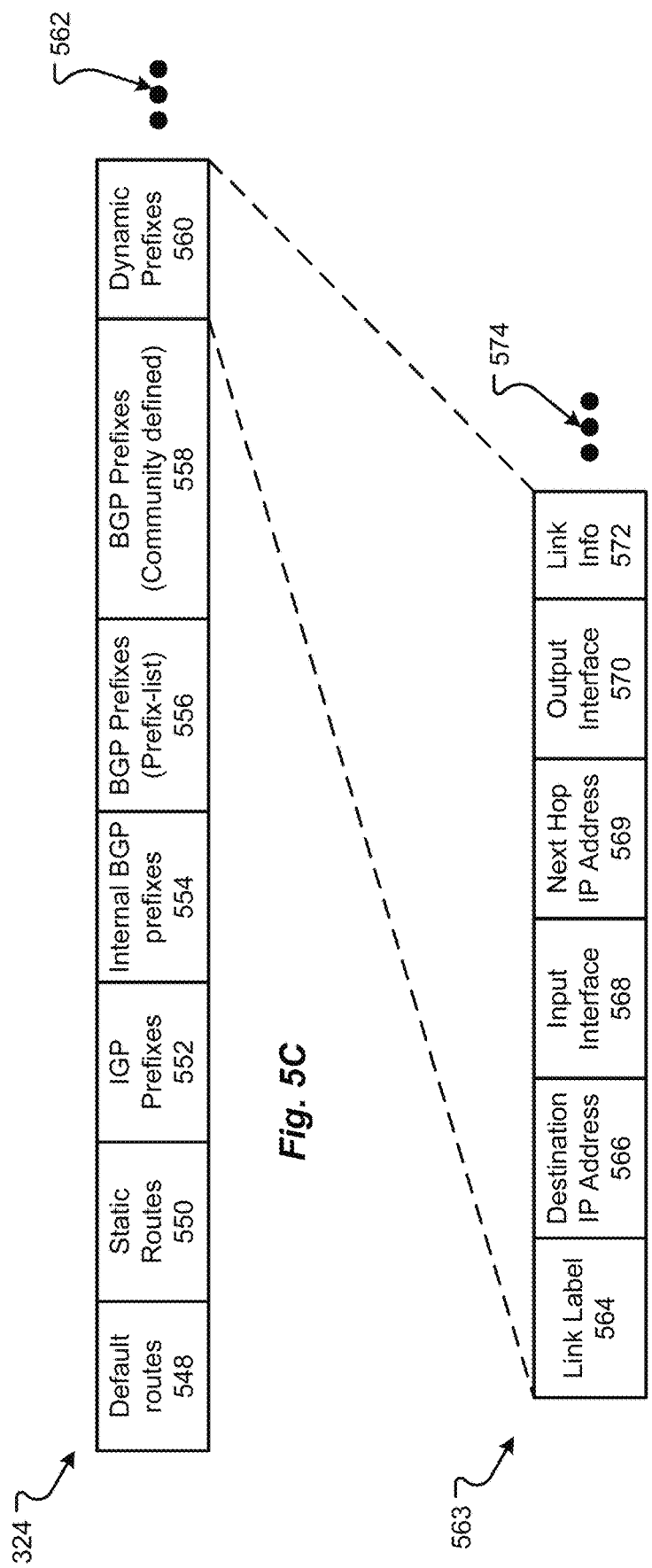

SYSTEMS AND METHODS FOR PROVIDING A DYNAMIC-HYBRID FORWARDING INFORMATION BASE (DHFIB)

FIELD

The present disclosure is generally directed to networking.

BACKGROUND

Communications between electronic devices (e.g., desktop computers, mobile devices, laptops, etc.) can occur through a network, for example, the Internet. Within the network, a group of interconnected routers can pass messages from the source or originating device, over one or more hops between the routers, to the destination or terminating device. To accomplish the routing of these messages, each router can include a list of addresses in a routing table that is used to create a Forwarding Information Base (FIB). The routers use the FIB to determine to which other router or device to send the communication. These routing decisions within the router occur quickly to prevent the signal from being delayed. Thus, the routers use special hardware, for example, special memory, to store the FIB to allow the router to retrieve routing information in the FIB quickly.

Unfortunately, the routing tables tend to increase in size over time, which, in turn, causes the FIBs to increase in size. To accommodate the larger FIBs, the special memory in the routers needs to be replaced or enhanced, which is very expensive. These expenses represent a large and ongoing expenditure for companies that provide access to the network.

BRIEF DESCRIPTION OF THE DRAWINGS

FIG. 4 depicts a signaling process in accordance with examples of the present disclosure;

FIG. 5C depicts a data structure that can be sent, received, stored, retrieved, etc. in accordance with examples of the present disclosure;

FIG. 5D depicts a data structure that can be sent, received, stored, retrieved, etc. in accordance with examples of the present disclosure;

DETAILED DESCRIPTION

The present disclosure provides a Dynamic-Hybrid FIB (DHFIB). In an example, a control component of a routing system builds a routing table that includes routing information (e.g., prefixes, addresses, etc.) for use by a first routing component. Then, the control component creates a DHFIB from the routing table, wherein the DHFIB is a portion of the routing table customized for the first routing component. Finally, the control component forwards the DHFIB to the first routing component to allow the first routing component to route communications. The routing table can be ordered or ranked based on traffic information from the first routing component. As such, the portion of the routing table selected for the DHFIB can be the set of prefixes in the routing table that represent the most frequently routed or most important prefixes in the routing table, either globally or specific to the first routing component.

Figure 1:
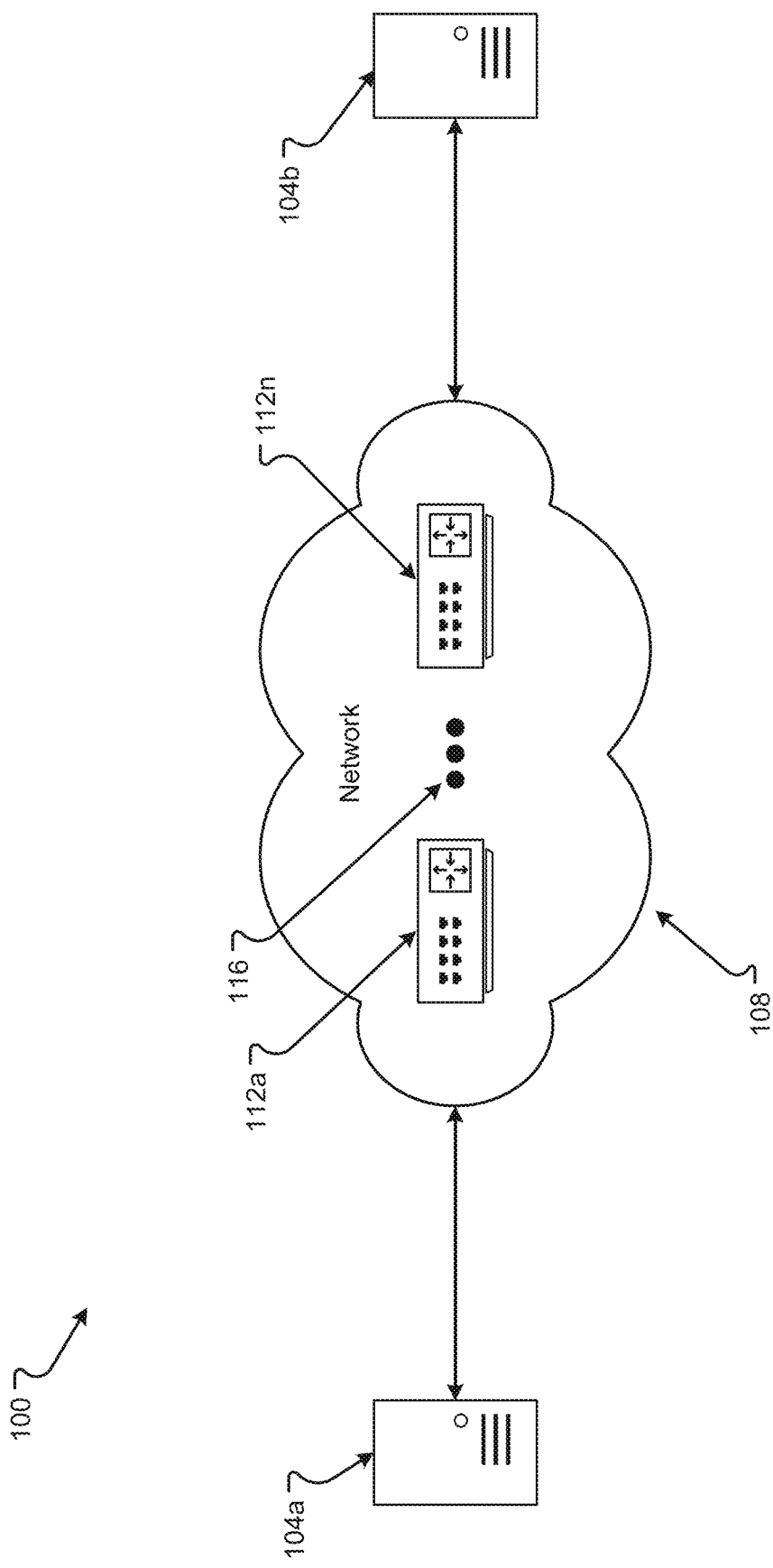
FIG. 1 depicts a communication environment in accordance with examples of the present disclosure.

An example of a communication environment 100 for routing communications with a DHFIB is shown in FIG. 1. The communication environment 100 can include a source device 104a and a destination device 104b (device 104a and device 104b, along with any similar devices, may be referred to collectively herein as devices 104). The devices 104 can be any type of device capable of communicating through the environment 100. For example, the devices 104 can be mobile devices, desktop computers, laptops, servers, memory or storage systems or repositories, or other types of devices or systems.

The devices 104 communicate through a network 108. The network 108 can represent any type of local, distant, wireless, or other type of network. For example, the network 108 may represent one or more of a local area network (LAN), a wide area network (WAN), a wireless LAN (WLAN), the Internet, etc. Further, the network 108 can represent a combination of two or more of the aforementioned network types.

The network 108 can be composed of one or more routing systems 112a through 112n (routing systems 112a through 112n may be collectively referred to herein as routing systems 112). There may be more or fewer routing systems 112 than those shown in FIG. 1, as represented by the ellipses 116. A routing system 112 can receive a communication that was originated from the source device 104a (and that may have been forwarded by one or more previous routing systems 112) and is to be routed to a destination device 104b. These communications may need to be routed or travel through one or more the routing systems 112 before reaching the destination device 104b, and, as such, each routing system 112 is operable to route the communications between and among the other routing systems 112 to reach the destination device 104b.

Figure 2A:
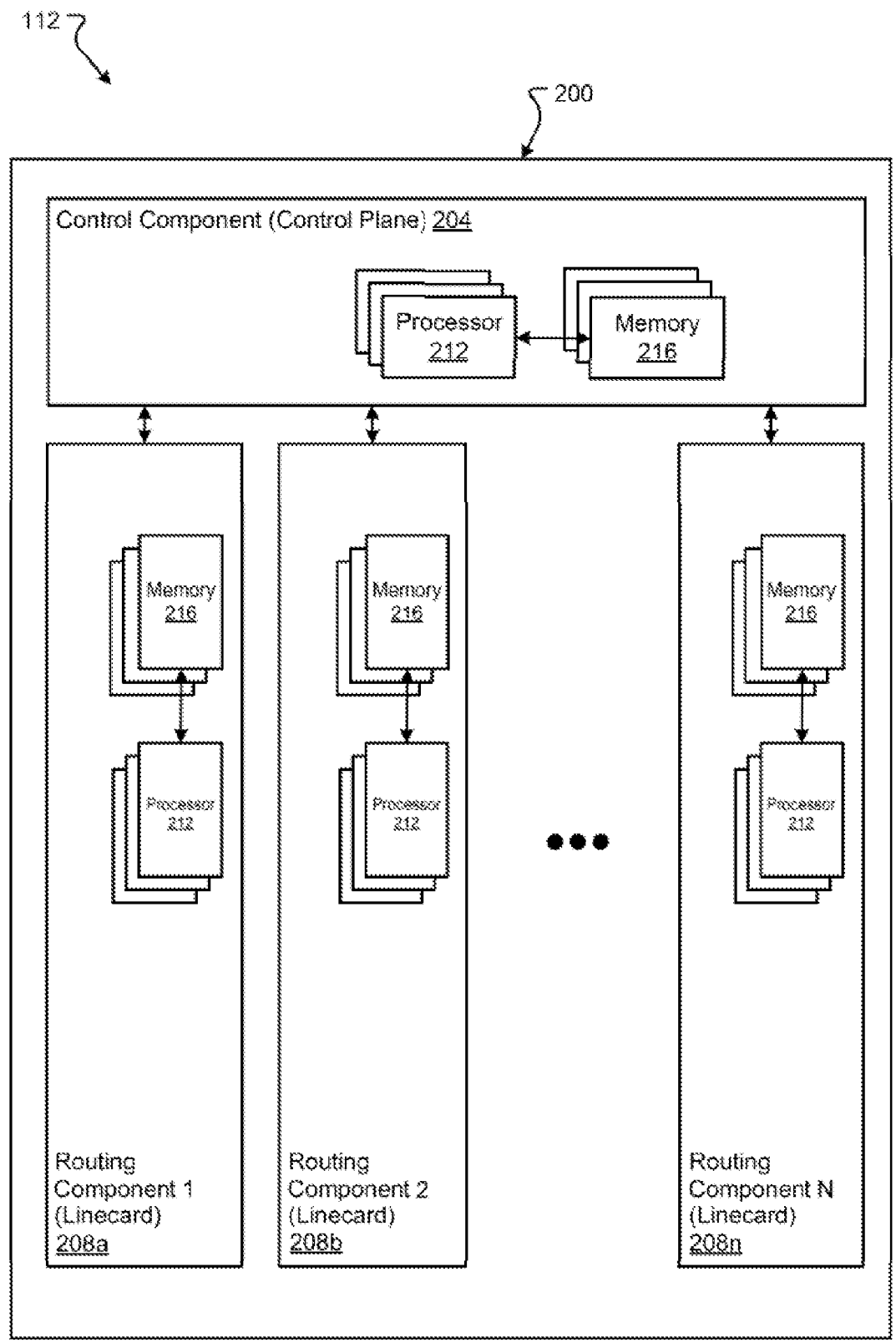
FIG. 2A depicts an example of a routing system in accordance with examples of the present disclosure.
Figure 2B:
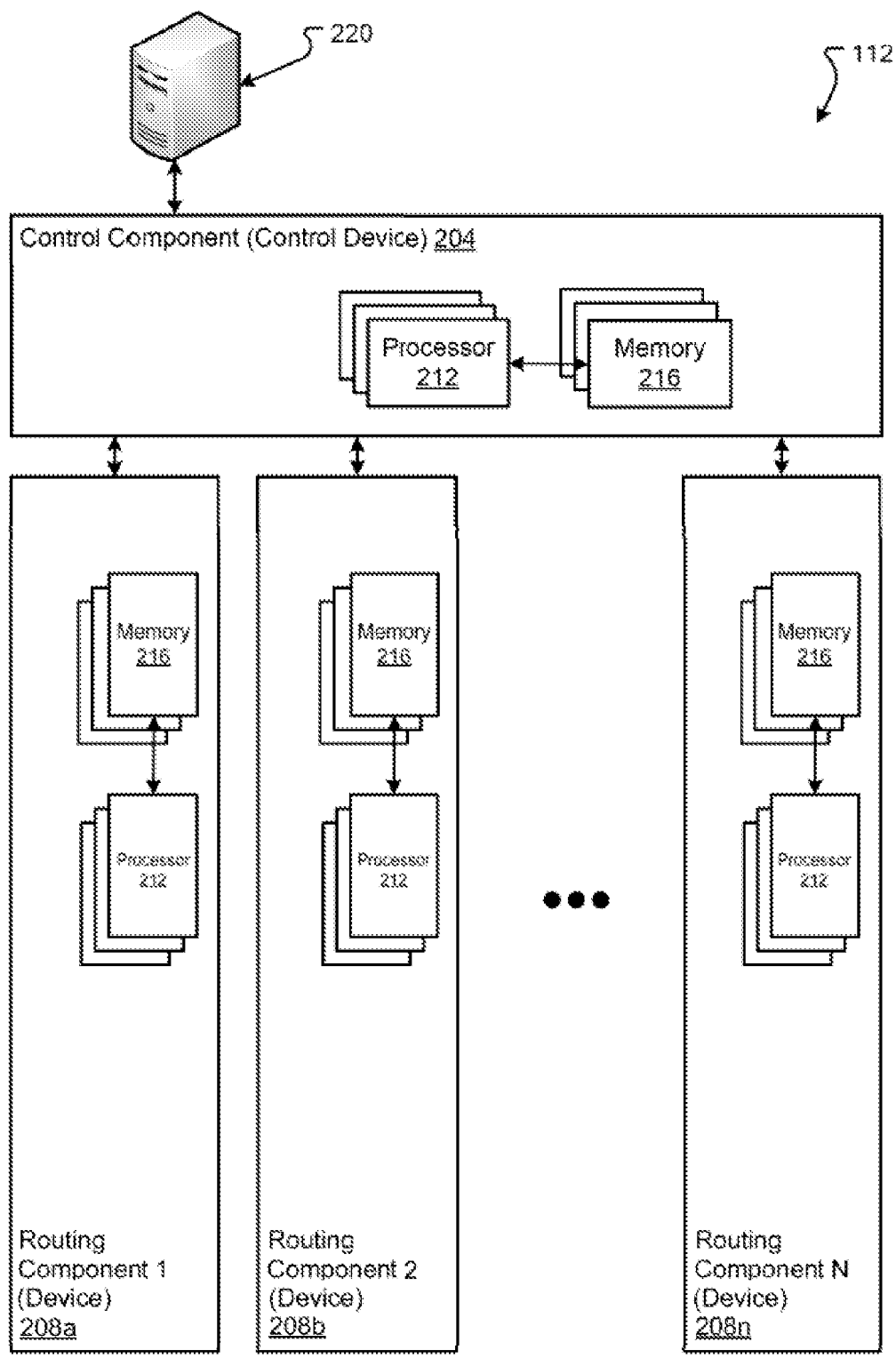
FIG. 2B depicts another example of a routing system in accordance with examples of the present disclosure.

An example routing system 112 may be shown as in FIG. 2A. The routing system 112 may be a physically separate device, such as a router 200. In contrast, a different routing system 112 may be as shown in FIG. 2B. In this example, the routing system 112 may be formed from several physically separate devices that may not be part of a single router or singular routing system 112. These two different routing systems 112 may have similar components, elements, or devices that perform similar functions. As such, the two configurations of the routing systems 112 are explained together hereinafter.

The routing system 112 can comprise one or more hardware elements that may be communicatively or electrically coupled, for example, via a control component 204. The control component 204 can be a control plane 204, as shown in FIG. 2a, a control device 204 as shown in FIG. 2B, or some other type of control component 204. In at least some configurations, the control component 204 may comprise one or more processors 212 and associated memory 216. In examples, each control component 204 can include two or more processors 212 that can each be considered a separate control component 204 (along with associated memory 216). Regardless, the control component 204 may provide information or other data to one or more routing components 208a through 208n (routing components 208a through 208n may be referred to herein as routing components 208). Further, the control component 204 may control at least some of the operations of the routing components 208.

The routing system 112, whether a router 200, as shown in FIG. 2A, or separate devices, as shown in FIG. 2B, can include one or more routing components 208a through 208n. The routing components 208 can be linecards, as shown in FIG. 2A, physically separate devices, as shown in FIG. 2B, or some other configuration of components. As with the control component 204, in at least some configurations, the routing component 208 may comprise a processor 212 and associate memory 216. As such, each routing linecard or device 208 can include two or more processors 212 and associated memory 216.

Each routing component 208 may control the routing or distribution of communication signals entering and leaving the routing system 112. For example, the routing component 208 may receive a communication at a first port, for example, at the router 200, and may route that communication to a destination device 104b or to another routing system 112, through a second port. Both the control component 204 and the routing component 208 can contain one or more hardware components to either control the routing component 208 or to route the communications.

The hardware components may include one or more of, but is not limited to, one or more processors 212, one or more input interfaces, one or more output interfaces, and one or more memory components 216. Examples of the processors 212 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core® family of processors, the Intel® Xeon® family of processors, the Intel® Atom® family of processors, the Intel Itanium® family of processors, Intel® Core® i5-4670K and i7-4770K 22 nm Haswell, Intel® Core® i5-3570K 22 nm Ivy Bridge, the AMD® FX® family of processors, AMD® FX-4300, FX-6300, and FX-8350 32 nm Vishera, AMD® Kaveri processors, Texas Instruments® Jacinto C6000® automotive infotainment processors, Texas Instruments® OMAP® automotive-grade mobile processors, ARM® Cortex®-M processors, ARM®. Cortex-A and ARM926EJ-S® processors, other industry-equivalent processors, and may perform computational functions using any known or future-developed standard, instruction set, libraries, and/or architecture. The processors 212 can also include one or more of, but are not limited to, application specific integrated circuits (ASIC), field programmable gate arrays (FPGA), other central processing units, a system-on-chip (SOC), or other types of processors.

The memory components 216 may be disk drives, optical storage devices, solid-state storage devices, such as a random access memory ("RAM") and/or a read-only memory ("ROM"), which can be programmable, flash-updateable and/or the like. However, in at least some configurations, the memory components are ternary content addressable memory/reduced latency dynamic random access memory (TCAM/RLDRAM) that are capable of reduce latency, high-speed switching to provide high-speed access to the FIB stored within the memory. Additionally or alternatively, each control component 204 and routing component 208 may have two or more processors 212, each with dedicated memory 216. In these configurations, each separate processor 212 with its associated memory 216 may be considered a separate routing component 208 although physically contained on a same linecard or other physical substructure with other processors 212.

The routing system 112 may also comprise software components, located within a working memory 216, including an operating system and/or other code. It should be appreciated that alternate examples of a routing system 112 may have numerous variations from that described above. For example, customized hardware might also be used and/or particular components might be implemented in hardware (e.g., ASIC gates), software (including portable software, such as applets), or both. Further, connection to other computing devices 220, such as network input/output devices, may also be employed to conduct at least one function of the software as described hereinafter.

Figure 3:
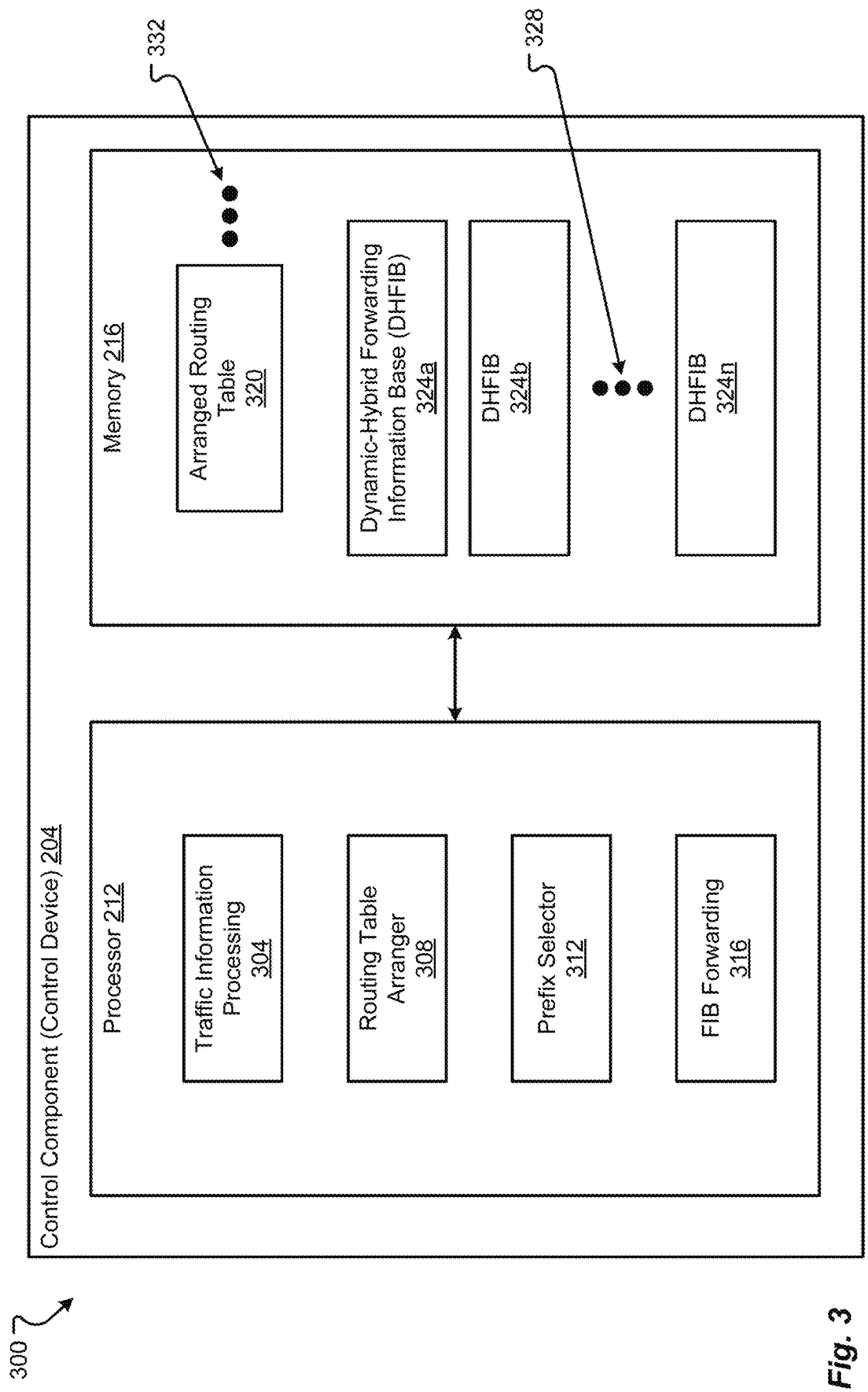
FIG. 3 depicts a software architecture in accordance with examples of the present disclosure.

An example of a software architecture 300 of a control component 204 may be as shown in FIG. 3. While the following is described as software, in at least some configurations, the software 300 may be embodied as gates or circuits in an ASIC, FPGA, or other hardware device. The software architecture 300 can include one or more applications, stored in working memory 216, and executed by the processor 212, and one or more data structures stored and accessed from memory 216. The applications can include one or more of, but are not limited to, a traffic information processing component 304, a routing table arranger 308, a prefix selector 312, and a FIB forwarding component 316. The data structures stored in memory 216 can include one or more of, but are not limited to, an arranged routing table 320 and one or more DHFIBs 324a-324n. There may be a DHFIB 324 for each routing component 208 that can be stored within memory 216 or may be created at the control component 204 and forwarded to the routing component 208 before that the DHFIB 324 is erased from memory 216. There may be more or fewer DHFIBs 324 in memory 216 than that shown in FIG. 3, as represented by the ellipses 328.

The traffic information processing component 304 can receive traffic information from one or more of the routing components 208. The traffic information can be parsed and analyzed by the traffic information processing component 304. From the traffic information processing, information about the most-important or most-routed prefixes may be sent to the routing table arranger 308. The traffic information can be information from one or more of any currently available or future developed traffic information processing software, hardware, or system.

The routing table arranger 308 can generate or edit an arranged routing table 320 associated with one or more of the routing components 208. Thus, the routing table arranger 308 may arrange prefixes (a prefix can mean any route stored in the routing table, FIB, DHFIB, etc.) or addresses within the arranged routing table 320. In this way, the arranged routing table 320 may have a listing of prefixes from the most-routed to least-routed routes. Once arranged, the routing table arranger 308 can send the information about the arranged routing table 320 to the prefix selector 312.

The prefix selector 312 can determine which prefixes from the arranged routing table 320 are selected to create the dynamic-hybrid forwarding information base (DHFIB) 324. in examples, the arranged routing table 320 may be specific to a particular routing component 208. Thus, the prefix selector 312 can generate and provide one DHFIB 324 from the arranged prefix information and include only a portion of the prefixes from the arranged routing table 320. The number of prefixes included within the DHFIB 324 may be determined as a portion or a percentage of the prefixes within the arranged routing table 320, can be based off a benchmark (for example, if the prefix in the arranged routing table 320 has been routed more than three times during a predetermined period of time), can be determined based on the capacity of the particular routing component 208, or by some other algorithm or calculation. The prefix selector 312 may then extract the prefixes from the arranged routing table 320 and can create the DHFIB 324. This DHFIB 324 may then be sent to the FIB forwarding component 316.

The FIB forwarding component 316 may send the DHFIB 324 to the particular routing component 208 for which the DHFIB 324 was prepared. In other examples, the DHFIB 324 is common to multiple (or all) routing components of a routing system 112. Thus, the FIB forwarding component 316 can address a communication, containing the DHFIB 324, and communicate that DHFIB 324 through an output interface to a processor 212 to one or more routing component(s) 208. Any address or other communication envelope required to send the DHFIB 324 may be generated by the FIB forwarding component 316 to send the DHFIB 324 through the output interface.

Figure 5A:
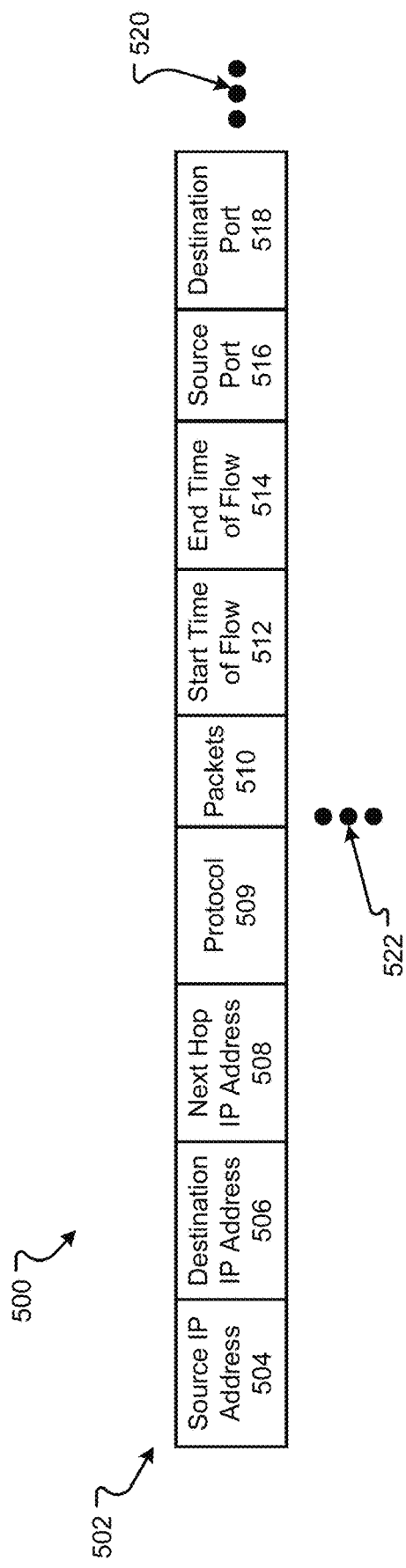
FIG. 5A depicts a data structure that can be sent, received, stored, retrieved, etc. in accordance with examples of the present disclosure.
Figure 5B:
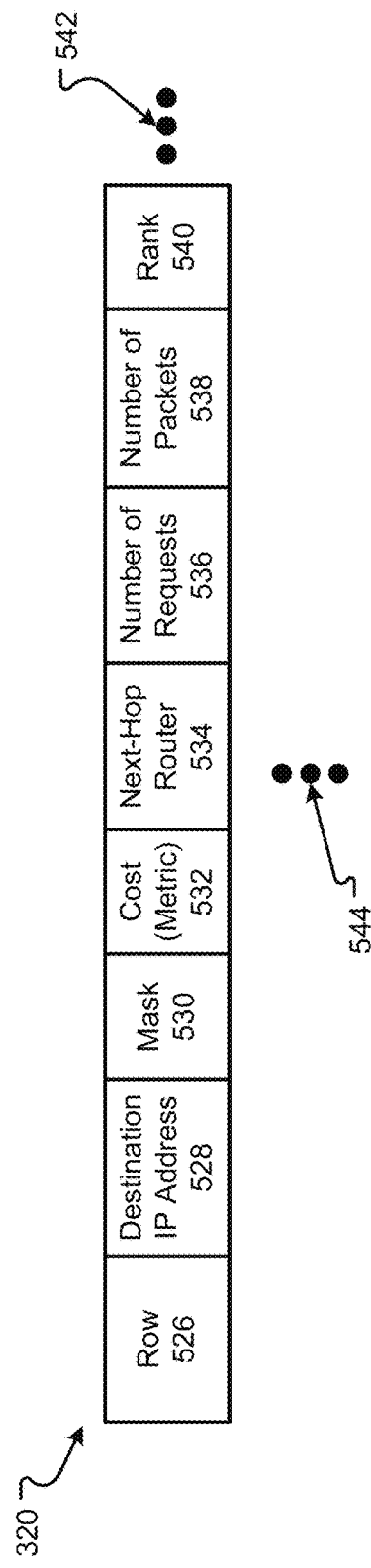
FIG. 5B depicts a data structure that can be sent, received, stored, retrieved, etc. in accordance with examples of the present disclosure.

The arranged routing table 320 is a data structure that includes one or more prefixes that may be arranged in an order from most-routed or most-important to least-routed or least-important. An example of the arranged routing table 320 may be as shown in FIG. 5B. The arranged routing table 320 may be particular to or associated with one routing component 208 and thus there may be more arranged routing tables 320 than those shown in FIG. 3, as represented by ellipses 332.

The DHFIB 324 may include a portion of the arranged prefixes from the arranged routing table 320. The DHFIB 324 may also include other information that is needed by the routing component 208 to route different communications through the routing system 112. An example of the DHFIB 324 may be as shown in FIGS. 5C and 5D.

An example of the routing or communications between the control component 204 and routing component 208 may be as shown in FIG. 4. This communication environment 400 may include communications to and from the control component 204 and routing component 208 over various different interfaces or using various communication protocols.

A first communication 404 may represent the control component 204 sending an initial FIB to the routing component 208. The initial FIB may include no prefixes within the FIB, may include a randomly chosen set of prefixes from the routing table, may contain some prefixes determined by historical or other trends from different routing components 208, may contain a copy of an FIB from a different routing component 208, or may contain other configurations or arrangements of the prefixes. The initial FIB, sent in communication 404, may not be a DHFIB as the traffic information may not have been received from that routing component 208 before the time of sending the initial FIB in signal 404; however, the initial FIB may be a snapshot of a DHFIB from a different routing component 208 already operating in the communication environment 100.

Sometime thereinafter, the routing component 208 may communicate traffic information, in communication 408. The traffic information communicated may be similar or the same as shown in data structure 502, as described in conjunction with FIG. 5A. This traffic information may be provided based on communications received and routed by the routing component 208, using the initial FIB.

The traffic information may be used by the control component 204 to generate the DHFIB 324, in process 420. Process 420 may be similar to or the same as process 700 as described in conjunction with FIG. 7. This created DHFIB may then be forwarded from the control component 204 to the routing component 208, in communication 412. With this new DHFIB 324, the routing component 208 can then route messages, in process 416. Process 416 may be the same or similar to method 600 described in conjunction with FIG. 6. These newly routed messages, routed in process 416, may then generate new traffic information. This new traffic information may then be sent again in communication 408. As such, the provision of traffic information from routing component 208 to the control component 204 and then the reception of the DHFIB 324 based off that information may be repeated, cyclical, and periodic. For example, the communications 408 and 412 and the processes 416 and 420 involved in receiving the DHFIB 324 may occur every second, every minute, every hour, every day, etc.

At some time after an initial receipt of the DHFIB 324, the routing component 208 can receive a communication 424. This communication 424 can originate from an external device, e.g., a routing system 112 or a source device 104*a*, and may be processed by the routing component 208. However, the communication 424 may include a prefix not contained within the DHFIB 324. In these situations, the routing component 208 can route or pass the communication to the control component 204 in communication 428. Thus, if a communication is received by the routing component 208 that is not in DHFIB 324, that communication may still be routed based on the control component 204 routing the communication using the routing table 320 rather than the DHFIB 324. If the communication 424 does include the prefix from the communication in the DHFIB 324, the routing component 208 routes the communication to the next device according to the DHFIB 324.

The data structures 500 that may be stored in memory 216 may be as shown in FIGS. 5A through 5D. A first data structure 502 may represent traffic information that may be sent from the routing component 208 to the control component 204. The data structure 502 can have one or more of, but is not limited to, the following fields: a source internet protocol (IP) address 504, a destination IP address 506, a next hop IP address 508, a protocol 509, a number of packets 510, a start time of the flow of data 512, an end time of the flow data 514, a source port 516, and a destination port 518. There may be more or fewer fields within data structure 502, as represented by ellipses 520. Each routing component 208 can have a different set of traffic information and thus there may be more or fewer data structures 502 sent to the control component 204 than shown in FIG. 5A, as represented by ellipses 522. Further, the data structure 502 may be sent periodically by the routing component(s) 208, for example, the data structure 502 may be sent every second, every minute, every hour, etc. The data structures 500 can characterize a traffic "flow," which can have predetermined types and/or a predetermined number of tuples, for example, five (5) tuples. Each of the various fields are explained further hereinafter.

The source IP address 504 may comprise the IP address of the source device 104*a*. The destination IP address 506, similarly, may comprise the IP address of the destination device 104*b*. Each of these IP addresses 504, 506 can represent at least a portion of the prefixes that are used by the routing system 112 and the network 108 to route the signals.

Data structure 502 can also include the next hop IP address 508, which may comprise the IP address of the next routing system 112 in the network path to the destination device 104b that is used to route the communication through the network 108. The protocol 509 can be any type of protocol used for the communication, for example, including, but not limited to, the Transmission Control Protocol (TCP), the User Datagram Protocol (UDP), the Internet Control Message Protocol (ICMP), etc. The packets field 510 can represent the number of packets sent in the communication(s) to the destination device 104b. The start time of the flow 512 can represent a time of when the first packet was sent to the destination device 104b by this routing system 112. Similarly, the end time of the flow 514 can represent the time at which the last packet was sent to the destination device 104b by this routing system 112.

The source port 516 can represent the port interface on the routing system 112 into which the communication was received. The destination port 518 may comprise the output interface port used to route the signal from the routing component 208 either to the destination device 104b or to the next hop routing system 112n.

An example of the arranged routing table 320 may be as shown in FIG. 5B. The arranged routing table 320 may be unique to each routing component 208 and unique to the latest traffic information, as explained in conjunction with FIG. 3. The arranged routing table 320 can include one or more of, but is not limited to, a row number field 526, a destination IP address 528, a mask 530, cost (or metric) 532, a next hop router 534, a number of requests 536, a number of packets 538, and a rank 540. There may be more or fewer fields within the arranged routing table 320, as represented by ellipses 542. Each of the different communications to a destination 104b may have its own row 526. Thus, there may be more or fewer rows than those shown in FIG. 5B, as represented by ellipses 544.

Each one of these of the rows 526 may represent a set of communications from a source device 104a or to a destination device 104b. Thus, the information within the row 526 may represent a determination of the importance or the frequency of this routing required by the routing component 208. The row field 526 may comprise a number or include an identifier for the information within that row.

The destination IP address 528 may be the same or similar to the destination IP address 506 in the traffic information data structure 502. The destination IP address 528 may comprise an IP address for the destination device 104b. This destination IP address 528 indicates the destination of the communication or communications and may be the prefix that is used to arrange the routing table.

The mask 530 or subnet mask can be used to determine what subnet an IP address belongs to for the communication of one or more signals to the destination IP address 528. The cost (or metric) 532 may represent at least a portion of the number of hops used to send the signal from the source device 104a to the destination device 104b. The next hop router 534 may indicate the next hop IP address 508 in the traffic information to the next routing system 112 used to route the signal.

The number of requests field 536 may comprise a number of times that this routing was requested by one or more source devices 104a to the destination device 104b. The number of requests field 536 can indicate a frequency or importance of this communication signal or routing.

A number of packets 538 can represent a total number of packets sent in all communications to the destination IP address 528, can represent a number of packets sent in one particular communication, or can indicate an average number of packets 538 used in the various communications to the destination IP address 528. The number of packets can determine the load for the different signals sent to the destination IP address 528 and thus the amount of load on the routing component 208 to route these communications to the destination device 104b.

A rank 540 indicates how the different communication sources or information are rated or ranked in the arranged routing table 320. Thus, the rank 540 indicates the actual arrangement of the arranged routing table 320. The rank 540 can be determined by a number of requests 536, number of packets 538, some combination of that information, or by other information provided in each row 526. The rank 540 is used to arrange the arranged routing table 320 from most-important or most-frequent communications to the least-important or least-frequent communications.

An example of a DHFIB 324, as described in conjunction with FIG. 3, may be as shown in FIG. 5C. The DHFIB 324 may be created from information including that stored in the arranged routing table 320 described in conjunction FIG. 5B. Each DHFIB 324 can include one or more of, but is not limited to, default routes 548, static routes 550, interior gateway protocol (IGP) prefixes 552, internal border gateway protocol (BGP) prefixes 554, BGP prefixes from a prefix list 556, BGP prefixes that are community defined 558, and dynamic prefixes 560. There may be more or fewer fields within the DHFIB 324, as represented by ellipses 562. An example of information within the dynamic prefixes 560 may be as shown in data structure 563 of FIG. 5D. Information within dynamic prefixes 560 may include various different destination IP addresses or prefixes, and thus, there may be more or fewer data structures 563 than that shown in FIG. 5D, as represented by ellipses 576. Data structure 563 can include one or more fields including, but not limited to, a link label 564, a destination IP address 566, an input interface 568, a next hop IP address 569, an output interface 570, link information 572, etc. There may be more or fewer fields in data structure 563, as represented by ellipses 574. The information in FIGS. 5C and 5D will be explained together.

The DHFIB 324 can have a set of predetermined information. The DHFIB 324 thus can be provided with dynamic prefixes up to a predetermined capacity (which is determined as the totally capacity of the DHFIB minus the space needed for the predetermined information) according to the priority of the dynamic prefix information in the arranged routing table 320. There can be a number of categories of predetermined information. For example, the fields 548, 550, 552, 554, 556, and 558 may be listed from highest priority to lowest priority. Thus, the capacity provided for the dynamic prefixes 560 may be governed by the amount of information in fields 548 through 558. A route map or route policy can define the priorities for the different fields 548 through 560 and the order of their priority. Further, the route policy or route map can define the amount of space provided in the DHFIB 324 for each of the fields 548 through 560.

A first field provides default routes 548, which can include one or more prefixes or routes that may be required for the operation of the routing component 208. Similarly, the static routes 550 can include prefixes for routes that are constant or persistent for the routing component 208. The IGP prefixes 552 can store any routes required for the internal gateway protocol messaging used to control the routing components 208. Similarly, the internal BGP routes or prefixes 554 can include routes required for BGP protocol messaging. The BGP prefixes 556 may be from a prefix list stored in the routing table at the control component 204. Other BGP prefixes 558 may be community defined. Community defined BGP prefixes 558 may comprise those that define prefixes used within a set or group of routing systems 112, for example, those routing systems 112 associated with a service provider. The BGP prefixes 556, 558 may be used to exchange routing reachability information amongst the different routing systems 112 in the network 108. These various prefixes 548 through 558 may be used for controlling the routing component 208 or conducting other administrative functions or communications.

Dynamic prefixes 560 include that information selected from the arranged routing table 320. Thus, the number and identity of dynamic prefixes 560 are variable and can change over time or amongst different routing components 208. The information within the dynamic prefixes can include that as shown in data structure 563.

The link label 564 can include some type of identifier for the link within or associated with the other information fields 566-572. The link label 564 can include a numeric, an alphanumeric, a globally unique identifier (GUID), or some other type of identifier. Link label 564 can be unique amongst all different links between the routing components 208 to the destination device 104b.

The destination IP address 566 can be the same or similar to the destination IP addresses stored in fields 528 or 506. The destination IP address 566 may comprise the prefix for the destination device 104b. The input interface 568 can describe the input requirements for the source device 104a or routing system 112a that is sending the information. This input interface 568 can include a port ID or other information. The next hop IP address 569 may comprise the IP address of the next hop routing system 112n in the network path to the destination device 104b that is used to route the communication through the network 108. The output interface 570 may comprise information about the output interface to the next hop routing system 112n or the destination device 104b. The output interface 570 can also list the port ID or other information.

Link information 572 can indicate other information about the link, for example, the communication protocol, any type of security, or other information. Link information 572 allows the routing component 208 to provide the type of service required by either the source device 104a, the destination device 104b, or another routing system 112n.

Figure 6:
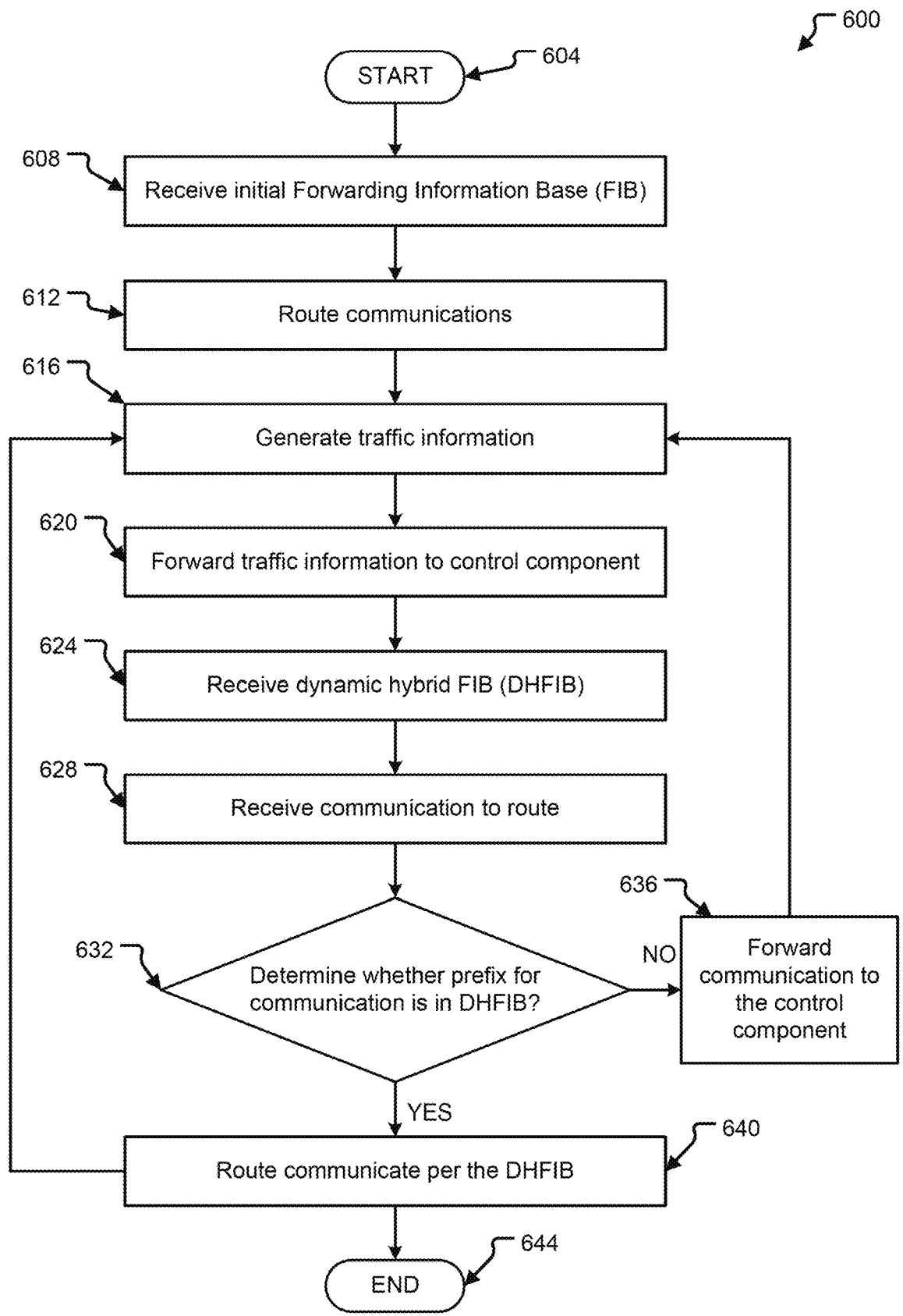
FIG. 6 depicts a method for routing communications with a DHFIB in accordance with examples of the present disclosure.

FIG. 6 shows a method 600 for routing communications with a DHFIB at a routing component, such as routing component 208, in accordance with examples of the present disclosure. A general order for the operations of the method 600 is shown in FIG. 6. Generally, the method 600 starts with a start operation 604 and ends with an end operation 644. The method 600 can include more or fewer operations or can arrange the order of the operations differently than those shown in FIG. 6. The method 600 can be executed as a set of computer-executable instructions executed by a processor, such as 212 of routing component 208, and encoded or stored on a non-transitory computer readable medium. Further, the method 600 can be performed by gates or circuits associated with a processor, an ASIC, a FPGA, a SOC, or other hardware device. Hereinafter, the method 600 shall be explained with reference to the systems, components, devices, modules, software, signals, data structures, interfaces, methods, etc. described in conjunction with FIGS. 1-5D and 7; however, it will be understood by those of skill in the art that some or all of the operations of method 600 can be performed by or using different elements from those described below.

The routing component 208 can receive an initial FIB information, in operation 608. The routing component 208 can be a linecard or other device, which can receive the initial FIB, in signal 404, communicated from the control component 204 to the routing component 208. This initial FIB may be received by the processor 212 and stored in memory 216 of the routing component 208. This FIB, as explained previously, may contain some portion of the information as provided in data structure 324. However, the dynamic prefixes 560 may not be complete or may not be based on traffic information, as the routing component 208 has yet to route any communication and could not, as of yet, provide traffic information. Thus, the dynamic prefixes 560 may be empty, filled with a random set of prefixes, filled with a set of prefixes defined by a community or other routing systems 112 that may be associated with the routing component 208, or may be filled with other information.

The routing component 208 may then route one or more communications based on the initial FIB, in operation 612. For example, the routing component 208 may receive a communication 424. If the routing component cannot find the prefix associated with the communication 424 within the initial FIB, the routing component 208 can direct that communication to the control component 204, as signal 428, for the control component 204 to route that communication. The receiving of communications and using the initial FIB may occur for some period of time before sufficient traffic information may be generated or available.

The routing component 208 can then generate traffic information, in operation 616. Over the course of several communications over a period of time, the routing component 208 can generate, update, and store the data structure 502 with various different entries and information associated with the types of communications being processed by that routing component 208. This traffic information 502 may be stored, e.g., in the memory 216 of the routing component and then can be sent to the control component 204.

The routing component 208 can forward the traffic information to the control component 204, in operation 620. For example, the processor 212, of the routing component 208, can send the signal 408, from the routing component 208 to the control component 204, which contains traffic information. The traffic information may be the same or similar to that described in data structure 502 of FIG. 5A. The traffic information processing component 304, of the processor 212, of the control component 204, can receive the traffic information. Traffic information in data structure 502 may then be used to create a DHFIB 324. The DHFIB 324 may then be sent back to the routing component 208 and can be received by the processor 212, of the routing component 208, in operation 624.

With the receipt of the DHFIB, the routing component 208 can receive a communication, for example communication 424, in operation 628. The communication 424 may have a prefix associated therewith and may be routed based on the DHFIB 324.

The routing component 208 can determine whether the prefix, in the communication, is in the DHFIB 324, in operation 632. The processor 212, of the routing component 208, can search for the prefix of the communication in the DHFIB 324. If the prefix is found in the DHFIB 324, the method 600 can proceed YES to operation 640. However, if the prefix is not found in the DHFIB 324, the method 600 may proceed NO to operation 636. In operation 636, the processor 212, of the routing component 208, may reroute the communication input 428 to the control component 204 to route the communication that is not in the DHFIB 324.

The method 600 may then proceed back to generate traffic information, in operation 616, including the prefix from the communication 424 that was not in the DHFIB 324. This new traffic information may then be processed again through the routing component 208 and the control component 204 to form a new or altered DHFIB 324.

In operation 640, the routing component 208 may route the communication 424 through to another routing system 112 or to the destination device 104b per the DHFIB 324. The method 600 may end at that operation 644 without further communications. However, the information about the routed message 424 can be provided back to the control component 204 as more traffic information, in operation 616, and at least part of the method 600 can recur. In this way, the DHFIB may be updated on a periodic or continuous basis to adapt appropriately to changing traffic being routed by the routing component 208.

Figure 7:
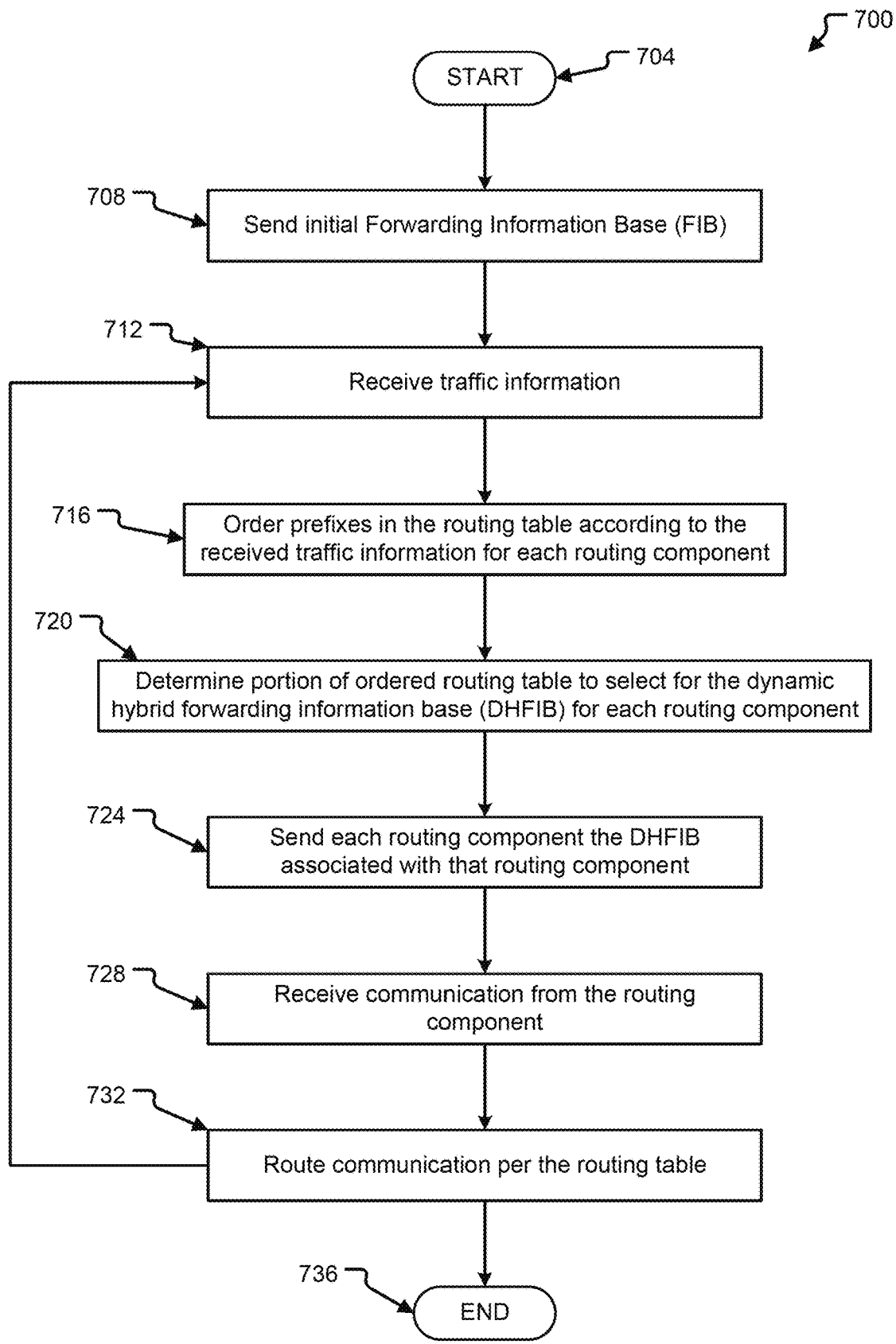
FIG. 7 depicts a method for generating a DHFIB in accordance with examples of the present disclosure.

FIG. 7 shows a method 700 for generating a DHFIB at a control component 204, in accordance with examples of the present disclosure. A general order for the operations of the method 700 is shown in FIG. 7. Generally, the method 700 starts with a start operation 704 and ends with an end operation 736. The method 700 can include more or fewer operations or can arrange the order of the operations differently than those shown in FIG. 7. The method 700 can be executed as a set of computer-executable instructions executed by a routing system 112 and encoded or stored on a computer readable medium. Further, the method 700 can be performed by gates or circuits associated with a processor, an ASIC, a FPGA, a SOC, or other hardware device. Hereinafter, the method 700 shall be explained with reference to the systems, components, devices, modules, software, signals, data structures, interfaces, methods, etc. described in conjunction with FIGS. 1-6; however, it will be understood by those of skill in the art that some or all of the operations of method 700 can be performed by or using different elements from those described below.

In examples, the initial FIB may be stored in memory 216 of the control component 204, and the FIB forwarding component 316 may send the initial FIB, in operation 708. The FIB forwarding component 316 can create an initial FIB from the routing table information in a routing table and send that information to one or more routing components 208. As previously described, the initial FIB may contain no prefixes, may contain a randomly generated number prefixes, can have a select portion of the routing table prefixes, may base the initial prefixes off of data from the community of routing components 208 or other routing systems 112, or may base the initial prefixes in the initial FIB based on other determinations or predetermined settings from a user.

Sometime thereinafter, the traffic information processing component 304 of the control component 204 can receive traffic information from the routing components 208, in operation 712. One or more data structures 502 may be received by the traffic information processing component 304. The information in data structure 502 may then be processed by the traffic information processing component 304 to determine and order the importance of the traffic being routed by the routing component 208. This importance information may then be provided to the routing table arranger 308.

The routing table arranger 308 can then order prefixes in the arranged routing table 320, according to the received traffic information, for each of the routing components 208, in operation 716. The routing table arranger 308 can create the arranged routing table 320 and may include rank information 540 in the arranged routing table 320. The arranged routing table 320 can have a rank 540, which orders the different prefixes or communications within the arranged routing table 320. The rank 540 can be based on the number of requests 536, the number of packets 538, other information, or a combination of any of the traffic information data structure 502. The ordering of the arranged routing table 320 may be for a single routing component 208.

The prefix selector 312 may then determine a portion of the arranged routing table 320 to use for the DHFIB 324 for that particular routing component 208, in operation 720. The prefix selector 312 can determine a number of prefixes to select and place into the dynamic prefixes 560 of the DHFIB 324, as shown in data structure 324. The number prefixes selected may be based the number prefixes reserved or available based on a total size of the DHFIB 324 minus any other prefixes in fields 548 through 558. The selection may be based on the top number or a predetermined number of prefixes in the arranged routing table 320 that are based on rank. These prefixes may be extracted from the table information 320 and put into fields 564 through 572. This newly created DHFIB 324 may then be sent or saved in memory 216 as, for example, DHFIB 324a.

The FIB forwarding component 316 may read or retrieve the DHFIB 324 from memory 216. The FIB forwarding component 316 may then send the DHFIB 324 to the particular routing component 208 associated with that DHFIB 324, in operation 724. In examples, a different DHFIB 324 is sent to each routing component 208 that is specific to that routing component 208. In other examples, one or more clustered or related routing components 208 may be sent the same DHFIB 324 based on aggregated traffic information received from those routing components 208. Sometime thereinafter, one or more communications, not having a prefix within the DHFIB 324, may be received at the routing component 208. These communications may be forwarded from the routing component 208 to the control component 204. The control component 204 can receive the communication from the routing component 208, in operation 728. This communication may have a prefix that is retrieved from the communication and compared to the routing table 320. The communication information from the routing table 320 may then be used to route that communication, in operation 732. Thus, the control component 204 can route a signal 424, which was forwarded from the routing component 208, as signal 428, to either a destination device 104b or to another routing system 112n. The method may then proceed back to operation 712 where new traffic information is received as a new data structure 502. A new DHFIB 324 may then be created and forwarded to the routing component 208. The new DHFIB 324 can include information about the communication (which did not have a prefix listed within the last DHFIB 324) routed by the control component 204 rather than the routing component 208.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or operations to those claimed, whether or not such alternate, interchangeable and/or equivalent structures, functions, ranges, or operations are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more non-transitory computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

An aspect of the present disclosure can comprise a method comprising building a routing table at a control plane that includes routing information for a first routing component; creating a Forwarding Information Base (FIB) from the routing table, wherein the FIB is a portion of the routing table and related to the first routing component; and forwarding the FIB to the first routing component.

Any of the one or more above aspects, further comprising: receiving traffic information from the routing component; determining the portion of the routing table to place in the FIB based on the traffic information.

Any of the one or more above aspects, wherein the traffic information describes prefixes in the routing table most routed by the routing component.

Any of the one or more above aspects, wherein the traffic information is information from one or more of NetFlow, sFlow, cflowd, Internet Protocol Flow Information Export (IPFIX), or Cisco Express Forwarding (CEF).

Any of the one or more above aspects, wherein the portion of the routing table forming the FIB is based on a benchmark.

Any of the one or more above aspects, wherein the benchmark is a percentage of most routed prefixes.

Any of the one or more above aspects, further comprising: receiving second traffic information from a second routing component; determining a second portion of the routing table to place in a second FIB based on the second traffic information; creating the second Forwarding Information Base (FIB) from the routing table, wherein the second FIB is the second portion of the routing table and related to the second routing component; and forwarding the second FIB to the second routing component.

Any of the one or more above aspects, wherein the first FIB and the second FIB are different.

Any of the one or more above aspects, further comprising: receiving second traffic information from the routing component at a second time; recreating a second FIB from the routing table based on the second traffic information, wherein the second FIB is a second portion of the routing table and related to the first routing component; and forwarding the second FIB to the first routing component to replace the FIB.

Any of the one or more above aspects, wherein the FIB includes the portion based on the traffic information and a default route, a static route an interior gateway protocol (IGP) prefix, an internal border gateway protocol (BGP) prefix, a BGP prefix defined by a prefix-list, or a BGP prefix defined by a community.

Another aspect of the present disclosure can comprise a routing component comprising: a memory to store instructions; a processor in communication with the memory, wherein the instructions cause the processor to execute a method, the method comprising: determining traffic information for the routing component; sending the traffic information to a control device; receiving a Forwarding Information Base (FIB) from the control device, wherein the FIB is a portion of a routing table and related to the routing component, and wherein the FIB is based on the traffic information; and routing a first communication based on the FIB.

Any of the one or more above aspects, the method further comprising: sending second traffic information to the control device at a second time; receiving a second FIB from the control device, wherein the second FIB is based on the second traffic information, wherein the second FIB is a second portion of the routing table, wherein the second FIB and the FIB are different; and routing a second communicating based on the second FIB.

Any of the one or more above aspects, wherein the traffic information is information from one or more of NetFlow, sFlow, cflowd, Internet Protocol Flow Information Export (IPFIX), or Cisco Express Forwarding (CEF).

Any of the one or more above aspects, wherein the FIB includes the portion based on the traffic information and a default route, a static route an interior gateway protocol (IGP) prefix, an internal border gateway protocol (BGP) prefix, a BGP prefix defined by a prefix-list, or a BGP prefix defined by a community.

Any of the one or more above aspects, before sending the traffic information, the method further comprising one of: receiving an empty FIB; receiving an FIB with random prefixes; or receiving an FIB with IGP prefixes, static prefixes, and prefixes determined by a BGP community.

Another aspect of the present disclosure can comprise a routing system comprising: a control component, wherein the control component builds a routing table that includes routing information for a first routing component; receives traffic information from the first routing component; creates a Forwarding Information Base (FIB) from the first routing table, wherein the FIB is a portion of the routing table, based on the traffic information, and related to the first routing component; and forwards the FIB to the first routing component; the first routing component in communication with the control component, wherein the first routing component: determines the traffic information for the first routing component; sends the traffic information to the control component; receives the FIB from the control component; and routes a first communicating based on the FIB.

Any of the one or more above aspects, further comprising: a second routing component, wherein the second routing component: determines second traffic information for the second routing component; sends the second traffic information to the control component; receives a second FIB from the control component; and routes a second communication based on the second FIB.

Any of the one or more above aspects, wherein the control component further: receives the second traffic information from the second routing component; determines a second portion of the routing table to place in the second FIB based on the second traffic information; creates the second FIB from the routing table, wherein the second FIB is the second portion of the routing table and related to the second routing component; and forwards the second FIB to the second routing component.

Any of the one or more above aspects, wherein the first routing component further: receives a third communication with a prefix not contained in the first FIB; routes the third communication to the control component; and wherein the control component routes the third communication based on information in the routing table.

Any of the one or more above aspects, wherein the routing component is one or more of a linecard, an Application Specific Integrated Circuit (ASIC) on a linecard, a processor on the linecard, memory on the linecard, or physically separate linecard device.

A means of or for any of the one or more above aspects.

Any of the one or more above aspects in combination with any of the other one or more above aspects.

What is claimed is:

1. A method comprising:
   determining, by a routing component, a traffic information for the routing component;
   sending, by the routing component, the traffic information to a control component;
   receiving, by the routing component, a Forwarding Information Base (FIB) from the control component, wherein the FIB is a portion of a routing table and related to the routing component, and wherein the FIB is based on the traffic information;
   routing, by the routing component, a first communication based on the FIB;
   sending, by the routing component, a second traffic information to the control component at a second time;
   receiving, by the routing component, a second FIB from the control component, wherein the second FIB is based on the second traffic information, wherein the second FIB is a second portion of the routing table, wherein the second FIB and the FIB are different; and
   routing, by the routing component, a second communication based on the second FIB.

2. The method of claim 1, wherein the traffic information describes prefixes in the routing table most routed by the routing component.

3. The method of claim 2, wherein the traffic information is information from one or more of NetFlow, sFlow, cflowd, Internet Protocol Flow Information Export (IPFIX), or Cisco Express Forwarding (CEF).

4. The method of claim 1, wherein the traffic information is information from one or more of NetFlow, sFlow, cflowd, Internet Protocol Flow Information Export (IPFIX), or Cisco Express Forwarding (CEF).

5. The method of claim 1, wherein the portion of the routing table forming the FIB is based on a benchmark.

6. The method of claim 5, wherein the benchmark is a percentage of most routed prefixes.

7. The method of claim 1, further comprising:
   sending, by the routing component, a third traffic information to the control component at a third time;

receiving, by the routing component, a third FIB from the control component, wherein the third FIB is based on the third traffic information, wherein the third FIB is a third portion of the routing table, wherein the third FIB, the second FIB, and the FIB are different; and routing, by the routing component, a third communication based on the third FIB.

8. The method of claim 1, wherein the FIB includes the portion based on the traffic information and a default route, a static route an interior gateway protocol (IGP) prefix, an internal border gateway protocol (BGP) prefix, a BGP prefix defined by a prefix-list, or a BGP prefix defined by a community.

9. The method of claim 1, wherein, before sending the traffic information, the method further comprises at least one of:

receiving, by the routing component, an empty FIB;

receiving, by the routing component, a FIB with random prefixes; or receiving, by the routing component, a FIB with IGP prefixes, static prefixes, and prefixes determined by a BGP community.

\* \* \* \* \*